(12) United States Patent
Fukuyama et al.

(10) Patent No.: US 7,204,783 B2
(45) Date of Patent: Apr. 17, 2007

(54) TOROIDAL TYPE CONTINUOUSLY VARIABLE TRANSMISSION

(75) Inventors: Masatoshi Fukuyama, Nagoya (JP); Toshifumi Hibi, Kanagawa (JP); Jun Sugihara, Kanagawa (JP); Toshikazu Oshidari, Kanagawa (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 430 days.

(21) Appl. No.: 10/459,442

(22) Filed: Jun. 12, 2003

(65) Prior Publication Data

US 2004/0014556 A1 Jan. 22, 2004

(30) Foreign Application Priority Data

Jul. 18, 2002 (JP) .............................. 2002-209518

(51) Int. Cl.
*F16H 15/38* (2006.01)
(52) U.S. Cl. .......................................... 476/10; 476/40
(58) Field of Classification Search .................... 476/8, 476/10, 40, 42
See application file for complete search history.

(56) References Cited

U.S. PATENT DOCUMENTS

| | | | | |
|---|---|---|---|---|
| 2,800,036 A | * | 7/1957 | Miller | 477/53 |
| 5,993,349 A | * | 11/1999 | Sugihara | 476/8 |
| 6,159,126 A | | 12/2000 | Oshidari | |
| 6,478,712 B1 | | 11/2002 | Kawamura et al. | |

FOREIGN PATENT DOCUMENTS

| | | |
|---|---|---|
| JP | 61-17761 A | 1/1986 |
| JP | 62-072951 A | 4/1987 |
| JP | 1-120429 U | 8/1989 |
| JP | 4-28268 U | 3/1992 |
| JP | 10-324177 A | 12/1998 |
| JP | 10-331938 A | 12/1998 |
| JP | 11-82655 A | 3/1999 |
| JP | 11-94062 A | 4/1999 |
| JP | 11-101321 A | 4/1999 |
| JP | 2000-9197 A | 1/2000 |
| JP | 2000-18376 A | 1/2000 |
| JP | 2001-99291 A | 4/2001 |

* cited by examiner

*Primary Examiner*—William C. Joyce
(74) *Attorney, Agent, or Firm*—Foley & Lardner LLP

(57) ABSTRACT

When, with engine kept stopped, driven road wheels are turned, the toroidal type continuously variable transmission is suppressed from shifting toward a higher speed side. That is, when, with the engine kept stopped, the road wheels are turned in a reverse direction due to a traction of a motor vehicle with its front end facing backward, an extra oil pump driven by the road wheels produces an oil pressure which is applied to a hydraulic servo mechanism to keep a speed change ratio at a lower speed side. While, when, with the engine kept stopped, the road wheels are turned in a forward direction due to a traction of the motor vehicle with its front end facing forward, the oil pressure produced by the extra oil pump is not practically used. Under this condition, a biasing spring suppresses a servo piston from moving in a direction to bring about a speed change ratio for the higher speed side.

13 Claims, 6 Drawing Sheets

TOROIDAL TYPE CONTINUOUSLY VARIABLE TRANSMISSION

BACKGROUND OF INVENTION

1. Field of Invention

The present invention relates in general to continuously variable transmissions, and more particularly, to toroidal type continuously variable transmissions for wheeled motor vehicles.

2. Description of Related Art

As is described in Laid-open Japanese Patent Application (Tokkaihei) 10-331938, a toroidal type continuously variable transmission for use with a wheeled motor vehicle comprises generally an input disc which receives a torque from an engine, an output disc which is coaxially arranged with the input disc and constantly engaged with driven road wheels to drive the same, power rollers which are each interposed between the input and output discs to transmit power therebetween by shearing oil film, and trunnions which rotatably support the power rollers. For controlling the transmission, there are employed an oil pump which is constantly driven by the engine, a forward speed control valve which is used under forward movement of the vehicle, a reverse speed control valve which is used under reverse movement of the vehicle, and a hydraulic servo mechanism which moves each trunnion in a manner to pivot the power roller between a neutral position where a rotation axis of the power roller intersects a common axis of the input and output discs and an offset position where the rotation axis of the power roller is offset toward a shaft axis of the corresponding trunnion.

Upon need of a speed change of the transmission under forward movement of the vehicle, a hydraulic pressure from the oil pump is directed to the hydraulic servo mechanism under control of the forward speed control valve, so that a controlled hydraulic pressure drives servo pistons of the hydraulic servo mechanism for moving the trunnions to pivot each power roller to a desired angled position.

With this, the power rollers are each applied, from the input and output discs, with a component force around the shaft axis of the corresponding trunnion, and thus, each power roller is forced to make a self-inclination around a shaft axis of the trunnion while continuously changing the radius of a circular arc described by the power roller and each of the input and output discs at their contacting portions. With this, a continuously variable speed change is carried out by the transmission.

During the operation, the progress of the speed change is fed back to the hydraulic servo mechanism, so that each trunnion is gradually returned toward the original shaft axis position, and when the speed change ratio actually made in the transmission becomes into coincidence with an instructed ratio, each power roller is returned to the neutral position allowing the transmission to keep the instructed speed change ratio.

SUMMARY OF INVENTION

Under operation of the engine, the hydraulic pressure is kept produced by the oil pump and thus the hydraulic servo mechanism is controllable.

However, when, with the engine kept stopped, the vehicle is under a coasting movement or being hauled, a torque is inputted from the driven road wheels to the output disc in a way contrary to the case of normal movement of the vehicle. In this condition of the vehicle, the hydraulic servo mechanism is dead, and thus, for the following reason, it tends to occur that an up-shifting is carried out in the transmission.

That is, when the output disc is fed with the torque from the driven road wheels, each power roller is compelled to receive a component force in a direction of the trunnion shaft axis from the contact portion with the input disc using a certain friction on the input disc as a so-called reaction force receiver, and thus each power roller becomes offset in the direction of the trunnion shaft axis and due to the above-mentioned self-inclination of the power roller, a speed change ratio for a higher speed side is set in the transmission. Of course, this phenomenon brings about a lack of torque directed to the driven road wheels at a subsequent starting of the vehicle and thus smoothed starting of the vehicle is not obtained.

Accordingly, it is an object of the present invention to provide a toroidal type continuously variable transmission which is free of the above-mentioned drawback.

According to the present invention, there is provided a toroidal type continuously variable transmission in which when, with the engine kept stopped, the driven road wheels are rotated due to a traction of the vehicle or the like, an extra oil pump is driven by the driven road wheels for operating the hydraulic servo mechanism in a manner to suppress the above-mentioned undesired up-shifting movement in the transmission.

According to the present invention, there is provided a toroidal type continuously variable transmission which comprises an input disc adapted to be driven by a prime mover of a motor vehicle; an output disc coaxially arranged with the input disc, the output disc being adapted to be constantly connected to road wheels of the vehicle; power rollers each being interposed between the input and output discs to transmit a torque from the input disc to the output disc through the power rollers; trunnions rotatably supporting the power rollers respectively; a main oil pump powered by the prime mover; a line pressure producing circuit which produces a line pressure by adjusting an oil pressure produced by the main oil pump; a hydraulic servo mechanism powered by the main oil pump, the hydraulic servo mechanism inducing a speed change between the input and output discs by actuating the trunnions in such a manner as to pivot a rotation axis of each power roller between a neutral position where the rotation axis intersects a common axis of the input and output discs at right angles and an offset position where the rotation axis is shifted toward a shaft axis of the trunnion while being offset relative to the common axis; a forward speed control valve through which the line pressure passes when the vehicle moves forward; a reverse speed control valve through which the line pressure passes when the vehicle moves backward; a feedback mechanism which feeds back a progress of the speed change to the hydraulic servo mechanism so that when a practical speed change ratio between the input and output discs becomes in coincidence with an instructed ratio, each power roller is returned to the neutral position; a forward/reverse switching valve which selectively feeds the line pressure to one of the forward and reverse speed control valves in accordance with a direction in which the vehicle moves, the forward/reverse switching valve having a line pressure inlet part to which the line pressure is applied; an extra oil pump powered by the road wheels; and an extra hydraulic circuit which feeds an oil pressure produced by the extra oil pump to the line pressure inlet part of the forward/reverse switching valve.

DETAILED DESCRIPTION OF EMBODIMENTS

In the following, embodiments of the present invention will be described in detail with the aid of the accompanying drawings.

Referring to FIGS. 1 to 4, there is shown a toroidal type continuously variable transmission of a first embodiment of the present invention, which is generally designated by numeral 100.

Figure 1:
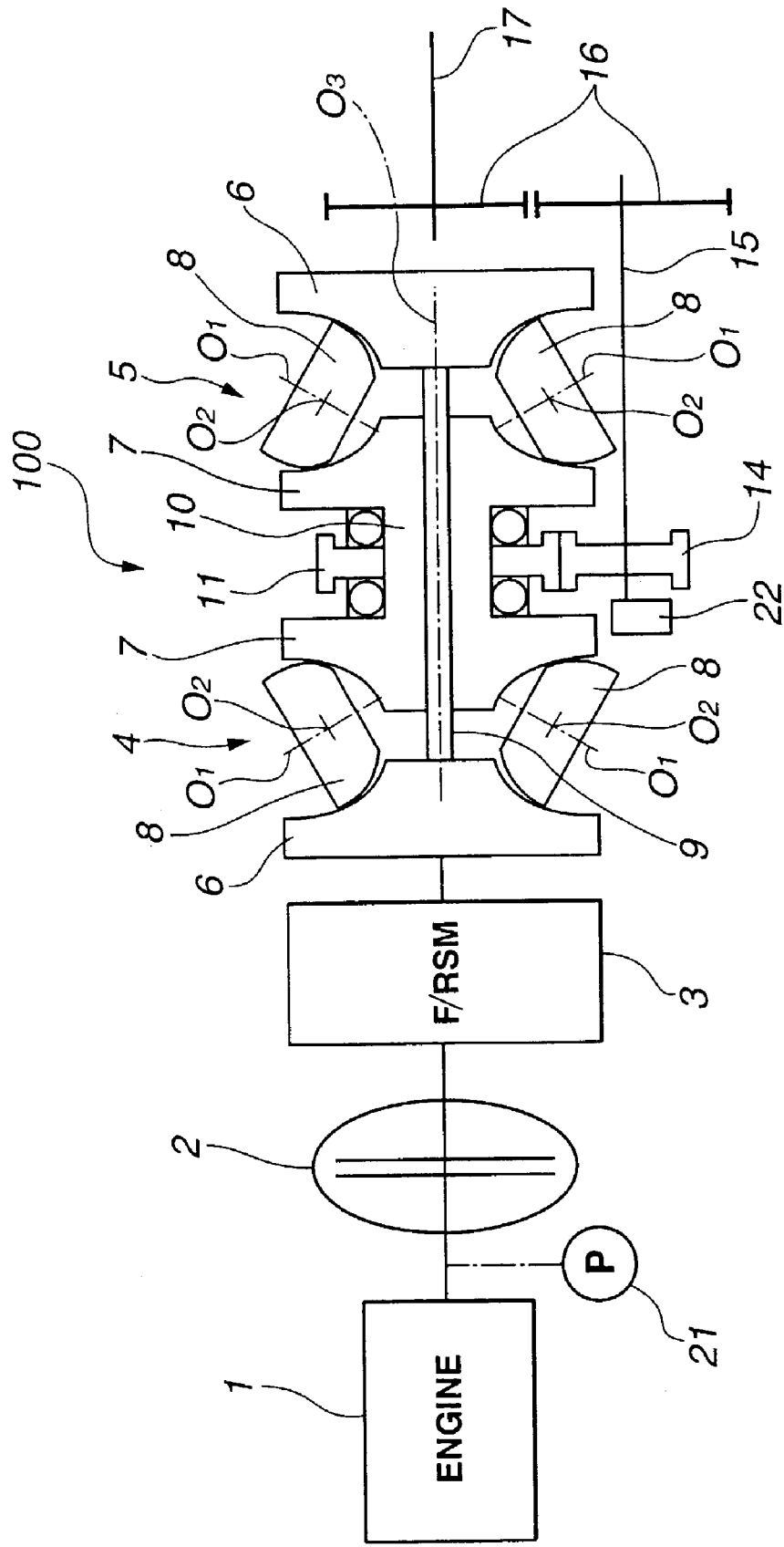
FIG. 1 is a schematically illustrated power path for a wheeled motor vehicle, which includes a toroidal type continuously variable transmission of a first embodiment of the present invention.

In FIG. 1, there is shown a power path for a wheeled motor vehicle, which is incorporated with the transmission 100 of the first embodiment.

The power path includes an engine 1, a torque converter 2, a forward/reverse switching mechanism (viz., F/RSM) 3 and transmission 100. That is, output power (viz., torque) of engine 1 is transmitted through torque converter 2 to forward/reverse switching mechanism 3. This switching mechanism 3 has generally three functions, the first being to transmit the rotation of a turbine of converter 2 to transmission 100 directly as in case of D-range state, the second being to transmit the rotation of the turbine to transmission 100 while changing rotation direction as in case of R-range state and the third being to block the connection between the turbine and transmission 100 as in case of P-range or N-range state.

The toroidal type continuously variable transmission 100 is of a double cavity type which comprises front and rear toroidal power transmitting units 4 and 5 which are coaxially arranged in a so-called back to back manner.

Toroidal power transmitting units 4 and 5 comprise each an input disc 6, an output disc 7 arranged to face input disc 6, and a pair of power rollers 8 each being sandwiched between input and output discs 6 and 7.

As shown, the two units 4 and 5 are coaxially arranged having their output discs 7 set in a back to back manner. The input disc 6 of the front unit 4 is connected to a driven member of switching mechanism 3 to rotate therewith.

Transmission 100 further comprises a main shaft 9 which has both ends to which input discs 6 of the two units 4 and 5 are connected to rotate together therewith. Thus, upon rotation of the driven member of forward/reverse switching mechanism 3, both input discs 6 of the two units 4 and 5 are rotated like a single unit.

As shown, output discs 7 of the two units 4 and 5 are concentrically and rotatably disposed about main shaft 9.

These two output discs 7 are integrally connected to each other through a hollow output shaft 10. Hollow output shaft 10 has an output gear 11 tightly disposed thereon.

Figure 4:
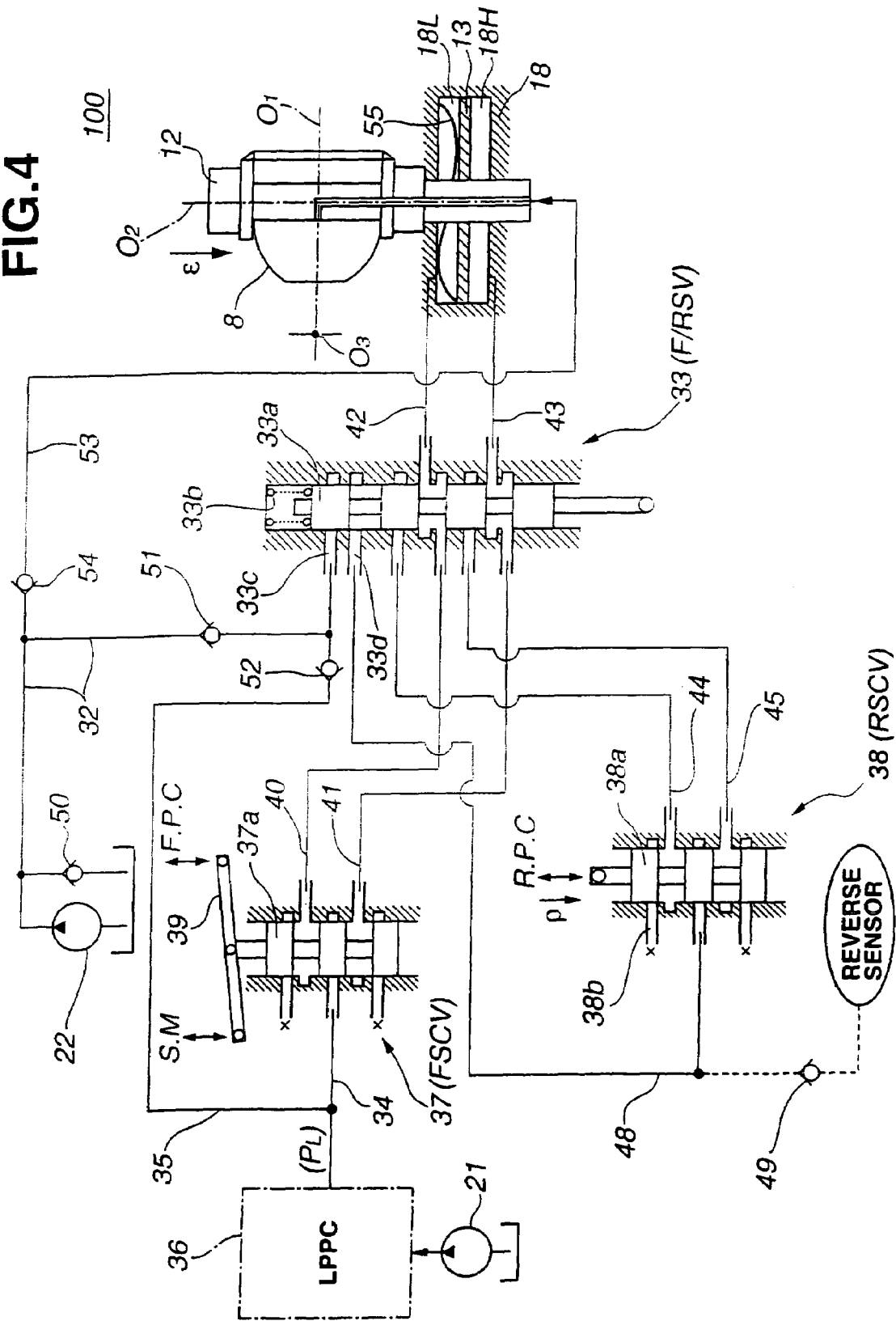
FIG. 4 is a hydraulic circuit for controlling operation of the transmission of the first embodiment.

As is seen from FIG. 4, each power roller 8 is rotatably supported by a trunnion 12. A rotation axis of the power roller 8 is denoted by reference "$O_1$", which will be referred to "power roller rotation axis" hereinafter. Designated by reference "$O_2$" is a shaft axis of the trunnion 12, which will be referred to "trunnion shaft axis" hereinafter. This axis "$O_2$" intersects with power roller rotation axis "$O_1$" at right angles. Designated by reference "$O_3$" is a rotation axis of input and output discs 6 and 7, which will be referred to "input/output disc rotation axis" hereinafter.

Each trunnion 12 has a lower end equipped with a servo piston 13 which is a part of a hydraulic servo mechanism. Servo piston 13 is slidably received in a servo piston body 18 to define therein low and high side piston chambers 18L and 18H. It is to be noted that in all (viz., four) of the power rollers 8, low side piston chamber 18L is positioned nearer to the associated power roller 8 than high side piston chamber 18H is.

Referring back to FIG. 1, for supporting the four power rollers 8, four trunnions 12 are respectively used, which are synchronously stroked in the same phase for carrying out a speed change operation of transmission 100.

In the following, the speed change operation of transmission 100 will be briefly described.

Rotation from forward/reverse switching mechanism 3 is transmitted to both input discs 6 of front and rear units 4 and 5 at the same time, and rotation of each input disc 6 is transmitted to the corresponding two power rollers 8 causing the same to rotate about their rotation axes "$O_1$" respectively.

Rotation of the two power rollers 8 of each unit 4 or 5 is transmitted to the corresponding output disc 7, and the rotation of two output discs 7 of the two units 4 and 5 is transmitted through output gear 11, a counter gear 14 meshed with output gear 11, a countershaft 15 and a gear unit 16 to an output shaft 17 which is coaxially arranged with main shaft 9. Although not shown in the drawing, output shaft 17 is connected to driven road wheels through a differential gear.

When, now, due to synchronous operation of servo pistons 13 and thus synchronous operation of trunnions 12, each rotating power roller 8 is shifted or inclined from a neutral position (viz., non-speed change position) shown in FIGS. 1 and 4 toward the trunnion shaft axis "$O_2$" offsetting power roller rotation axis "$O_1$" relative to input/output disc rotation axis "$O_3$", each power roller 8 is inclined around trunnion shaft axis "$O_2$" due to a component force produced.

Due to such self-inclination of each power roller 8, the radius of a circular arc described by the power roller 8 and each of input and output discs 6 and 7 at their contacting portions is continuously changed, so that a speed change ratio of front and rear toroidal power transmitting units 4 and 5 can be continuously varied.

When the speed change ratio actually made in transmission 100 becomes into coincidence with an instructed ratio, all power rollers 8 are retuned to their initial neutral positions due to the work of servo pistons 13 and trunnions 12. Under this state, the instructed speed change ratio can be kept in transmission 100.

When, under the above-mentioned speed change operation with transmission 100 kept in D-range, high side piston chamber 18H of the hydraulic servo mechanism (see FIG. 4) is fed with a hydraulic pressure and at the same time a hydraulic pressure in low side piston chamber 18L is discharged, servo piston 13 is shifted upward in the drawing causing up-shifting movement toward a higher speed change ratio in transmission 100. While, when the hydraulic pressure in high side piston chamber 18H is discharged and at the same time low side piston chamber 18H is fed with a hydraulic pressure, servo piston 13 is shifted downward causing down-shifting movement toward a lower speed change ratio in transmission 100.

While, when, under the above-mentioned speed change operation with transmission 100 kept in R-range, high side piston chamber 18H is fed with a hydraulic pressure and at the same time the hydraulic pressure in low side piston chamber 18L is discharged, servo piston 13 is shifted upward. But, due to the reverse function of the forward/reverse switching mechanism 3, the upward sifting of servo piston 13 induces down-shifting movement toward the lower speed change ratio in transmission 100. While, when the hydraulic pressure in high side piston chamber 18H is discharged and at the same time low side piston chamber 18L is fed with a hydraulic pressure, up-shifting movement toward the higher speed change ratio is carried out in transmission 100.

Referring back to FIG. 1, an oil pump 21 is provided which is driven by engine 1 for producing an oil pressure to control the hydraulic servo mechanism as well as forward/reverse switching mechanism 3.

It is now to be noted that in accordance with the present invention, there is further provided an extra oil pump 22 which is driven by countershaft 15. In the illustration, extra oil pump 22 is connected to a front end of countershaft 15.

Countershaft 15 is constantly connected to the driven road wheels (not shown) through gear unit 16, output shaft 17 and the differential gear (not shown).

Accordingly, when, with engine 1 kept stopped, the associated motor vehicle is under coasting or being hauled with the driven road wheels put on a road surface, extra oil pump 22 is inevitably driven due to rotation of the driven road wheels.

Figure 2:
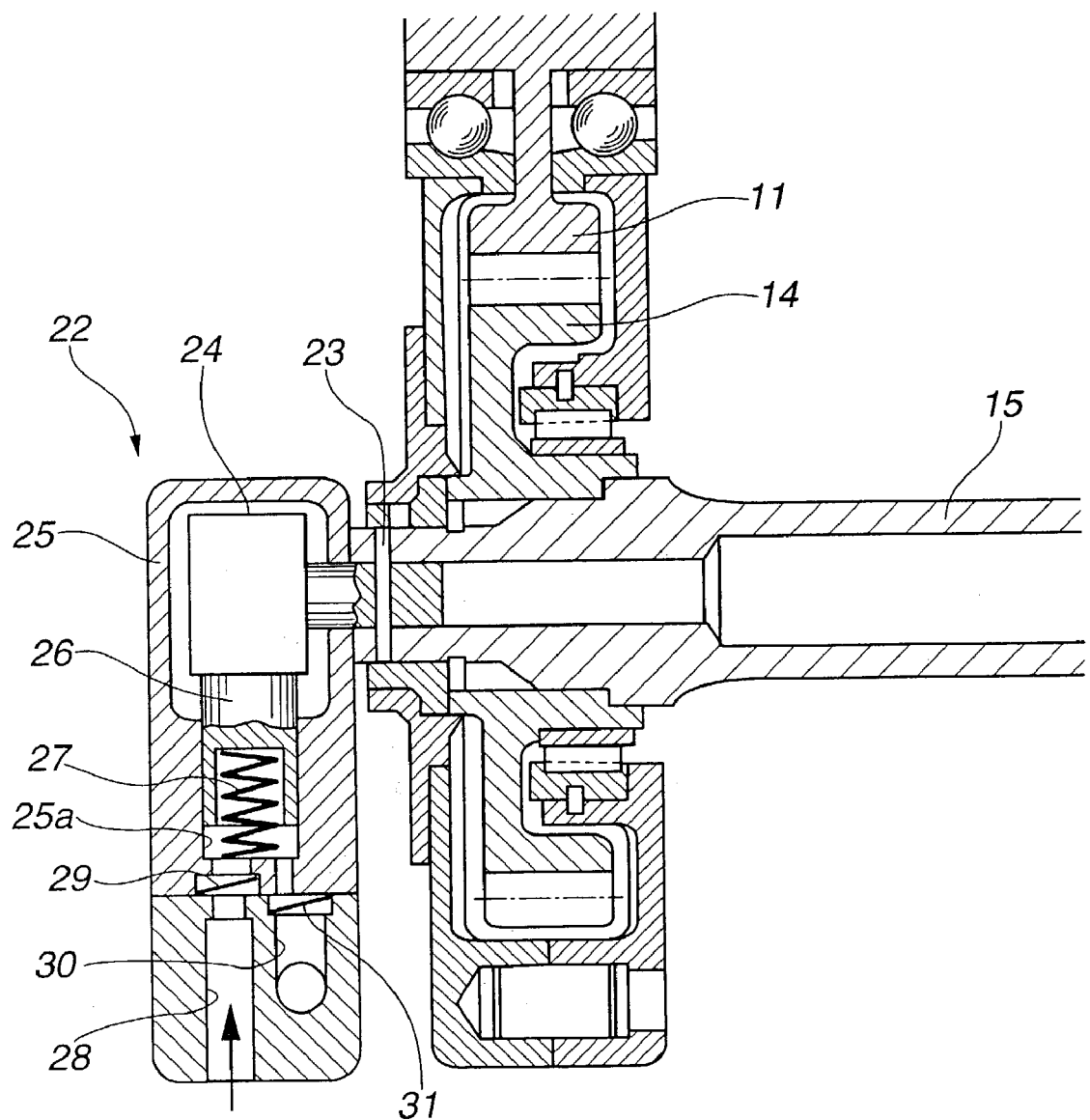
FIG. 2 is an enlarged sectional view of a part of the transmission of the first embodiment, showing an extra oil pump.
Figure 3:
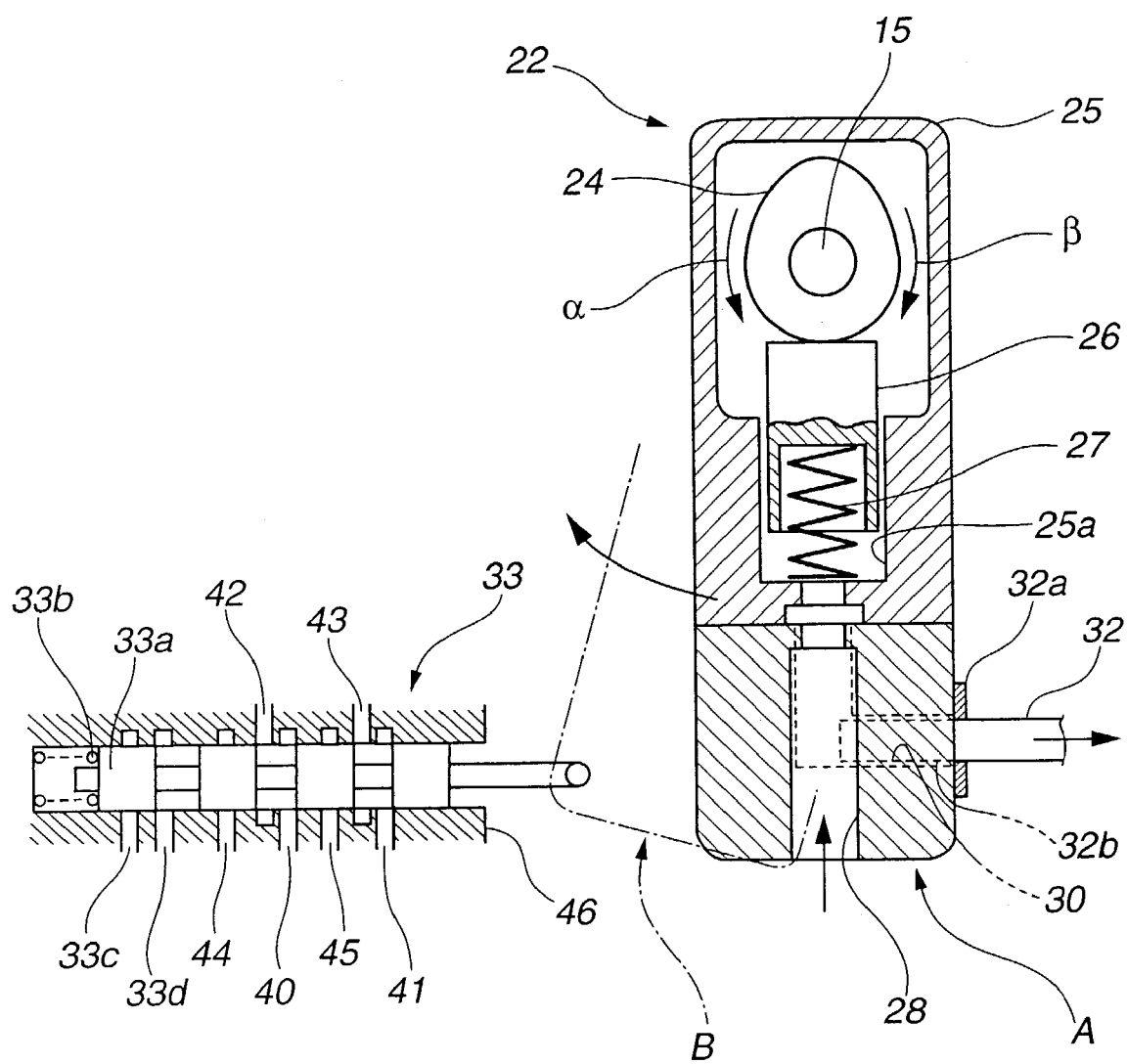
FIG. 3 is an enlarged sectional view of the extra oil pump incorporated with a forward/reverse switching valve.

As is seen from FIGS. 2 and 3, extra oil pump 22 is a plunger pump, which comprises an eccentric cam 24 which is connected to the front end of countershaft 15 by means of a pin 23, and a pump housing 25 which houses therein eccentric cam 24. As is understood from FIG. 3, pump housing 25 is rotatable about an axis of countershaft 15, that is, about a rotation axis of eccentric cam 24.

A plunger 26 is slidably received in pump housing 25, which is biased toward eccentric cam 24 by a spring 27, so that an upper end thereof constantly contacts with a cam surface of cam 24.

As is well shown in FIG. 2, pump housing 25 has a pump chamber 25a incorporated with plunger 26. Pump housing 25 has further inlet and outlet ports 28 and 30 which are connected to each other through pump chamber 25a. Inlet and outlet ports 28 and 30 have inlet and outlet valves 29 and 31 installed therein respectively. Intake port 28 is positioned below a level of oil received an oil pan (not shown) of transmission 100.

Accordingly, when, due to rotation of countershaft 15, eccentric cam 24 is rotated, plunger 26 is forced to make a reciprocation movement expanding and contracting pump chamber 25a repeatedly. With this, due to operation of inlet and outlet valves 29 and 31, oil is led into to pump chamber 25a from inlet port 28 and discharged from outlet port 30.

As is seen from FIG. 3, near the lower portion of pump housing 25, there is stationarily arranged an outlet pipe 32 which has a leading end 32b insertable into outlet port 30 of pump housing 25. Outlet pipe 32 has a circular flange 32a fixed thereto.

When, as is seen from the drawing, eccentric cam 24 is rotated in the direction of the arrow "α" in response to forward movement of the vehicle, pump housing 25 is forced to pivot in the same direction as cam 24 due to a dragging work of cam 24 applied to plunger 26 and thus, pump housing 25 is stopped at an illustrated position "A" where circular flange 32a of outlet pipe 32 abuts on the lower portion of pump housing 25 having the leading end 32b received in outlet port 30.

While, when eccentric cam 24 is rotated in the opposite direction, that is, in the direction of the arrow "β" in response to reverse movement of the vehicle, pump housing 25 is forced to swing in the opposite direction and stopped at a position "B" indicated by a phantom line keeping the fluid connection between the leading end 32b of outlet pipe 32 and outlet port 30.

As will be described in detail hereinafter, the swing movement of pump housing 25 from position "A" to position "B" shifts a forward/reverse switching valve (viz., F/RSV) 33 to a reverse position. That is, due to the swing movement of pump housing 25, a spool 33a of valve 33 is pushed into the bore against spring 33b to a depressed position, viz., the reverse position.

More specifically, when pump housing 25 is in the illustrated position "A", spool 33a assumes the illustrated right position, and when pump housing 25 is swung from the illustrated position "A" to the inclined position "B", spool 33a is moved leftward to assume a left position (not shown). Thus, when, with engine 1 kept stopped, the vehicle is being hauled with its front face facing backward, pump housing 25 assumes the inclined position "B" and thus spool 33a assumes its left position (not shown).

Accordingly, pump housing 25 of extra oil pump 22 has a so-called forward/reverse sensor function.

Figure 5:
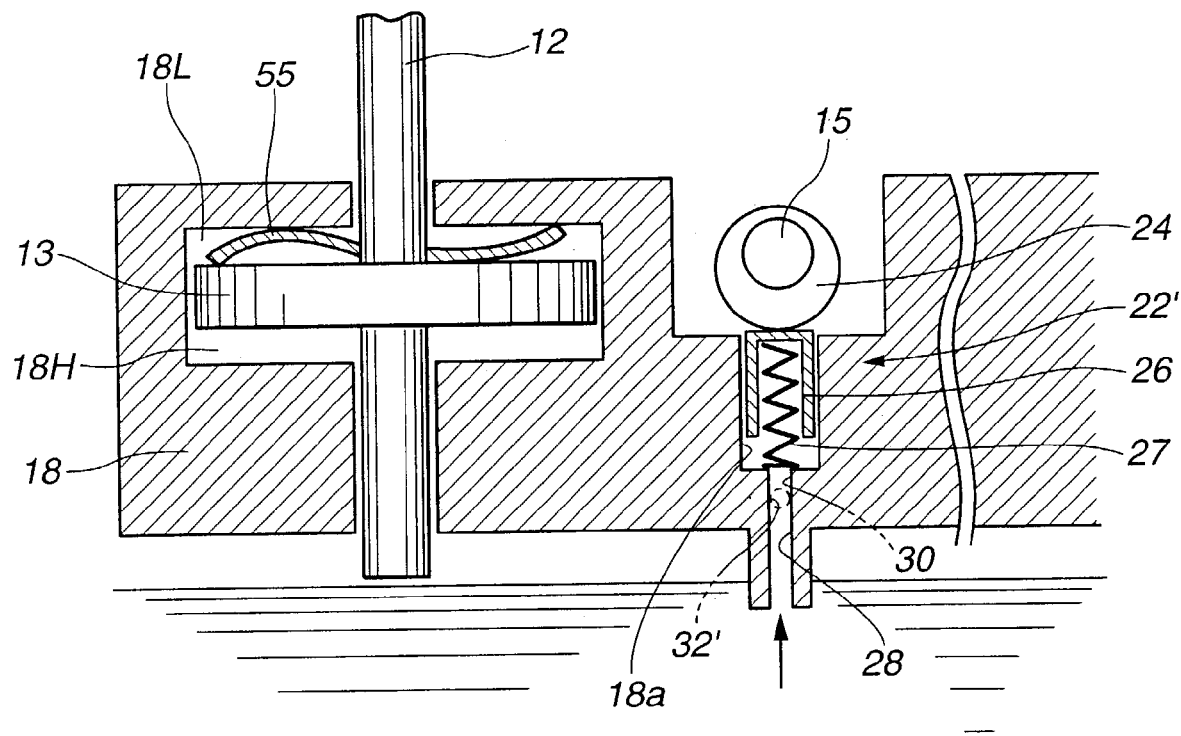
FIG. 5 is a sectional view of another extra pump incorporated with a servo piston body.

If desired, in place of the extra oil pump 22 having the above-mentioned construction, a modified extra oil pump 22' shown in FIG. 5 may be used. That is, this modified pump 22' is installed in servo piston body 18. Plunger 26 is slidably received in a bore formed in servo piston body 18, which is biased toward eccentric cam 24 by spring 27 installed in the bore. Inlet port 28 and outlet port 30 are also formed in servo piston body 18, which are connected to pump chamber 18a. Although now shown, inlet and outlet valves are installed in inlet and outlet ports 28 and 30 respectively. Thus, under rotation of eccentric cam 24, oil in the oil pan is led into outlet port 30 through inlet port 28 and pump chamber 18a. Servo piston body 18 is further formed with an outlet passage 32' which is connected with outlet port 30.

The modified oil pump 22' has no means that has the forward/reverse sensor function possessed by the above-mentioned pump housing 25 of the extra oil pump 22. Thus, when practically used, modified oil pump 22' has to use a mechanical reverse sensor which can sense a reversed rotation of countershaft 15. That is, upon sensing such reversed rotation by the sensor, a suitable member shifts spool 33a (see FIG. 3) of valve 33 to the left position.

Furthermore, other types of oil pump may be used in the invention as the extra oil pump 22. One is a type wherein plunger 26 is operatively received in a bore formed in a separate body member that is connected to servo piston body 18, one is a type wherein plunger 26 is operatively installed in a bore formed in a body 46 (see FIG. 3) of forward/reverse switching valve 33, and the other is a type wherein plunger 26 is operatively received in a bore formed in a separate body member that is connected to the body 46.

Referring to FIG. 4, there is shown a hydraulic circuit for controlling operation of transmission 100 of the first embodiment. As is seen from this drawing, outlet pipe 32 from extra oil pump 22 is led to the hydraulic circuit.

Hydraulic circuit comprises a line pressure producing circuit (viz., LPPC) 36 which produces a line pressure "$P_L$" by adjusting a hydraulic pressure produced by oil pump 21 driven by engine 1. Line pressure "$P_L$" is fed to a main circuit 34 and a sub-circuit 35.

To main circuit 34, there is connected a forward speed control valve (viz., FSCV) 37, and to sub-circuit 35, there is connected a sub-circuit 48 through ports 33*c* and 33*d* of the above-mentioned forward/reverse switching valve 33. To sub-circuit 48, there is connected a reverse speed control valve 38.

Forward and reverse speed control valves 37 and 38 may be the ones which are disclosed in Laid-open Japanese Patent Application (Tokkaihei) 11-94062.

Between forward and reverse speed control valves 37 and 38 and low and high side piston chambers 18L and 18H of the above-mentioned servo piston 13, there is arranged the forward/reverse switching valve 33. These valves 37, 38 and 33 are installed in body 46 (see FIG. 3) of the valve 33.

Forward speed control valve 37 comprises a spool 37*a* which is connected to a middle portion of a speed control lever 39. A first end of this control lever 39 is moved by a step motor (viz., S.M.) to a position that corresponds to an instructed speed change ratio. A second end of control lever 39 abuts on a forward precess cam (viz., F.P.C) for achieving a feedback control of transmission 100.

That is, when, due to operation of the step motor, the first end of control lever 39 is shifted to the position that corresponds to the instructed speed change ratio, control lever 39 is forced to pivot about the second end thereof in the corresponding direction. With this, spool 37*a* is moved in a corresponding direction in the valve body, so that line pressure "$P_L$" of main circuit 34 is fed to one of output circuits 40 and 41 drawing the pressure from the other of the circuits 40 and 41. With this, the pressure is fed to low or high side piston chamber 18L or 18H of piston body 18 through one of output circuits 42 and 43, so that due to a pressure difference between two chambers 18L and 18H, servo piston 13 is moved from a neutral position to a desired position for the instructed speed change ratio.

Progress of this speed change movement is fed back to the second end of speed control lever 39 through the forward precess cam, so that servo piston 13 is moved toward the neutral position with progress of the speed change movement. That is, when a speed change ratio actually made in transmission 100 becomes into coincidence with the instructed speed change ratio, speed control lever 39 moves spool 37*a* to the original position where both output circuits 40 and 41 are closed, so that the speed change ratio thus instructed is kept by transmission 100.

When spool 33*a* of forward/reverse switching valve 33 is shifted from the position shown in FIG. 4 to an upper position due to reverse movement of the vehicle, ports 33*c* and 33*d* become merged and output circuits 40 and 41 become communicated with circuits 44 and 45 blocking output circuits 42 and 43. With this, reverse speed control valve 38 carries out the following speed change operation.

That is, upon the above-mentioned operation, a spool 38*a* of the valve 38 is shifted through a reverse precess cam (viz., R.P.C.) in such a direction as to move the actually made speed change ratio toward a fixed reverse speed ratio that is instructed. With this, line pressure "$P_L$" is applied from sub-circuit 35 (48) to one of output circuits 44 (42) and 45 (43) while draining oil from the other of the circuits. With this, due to a pressure difference between low and high side piston chambers 18L and 18H, servo piston 13 is moved from the neutral position to a desired position for achieving the instructed reverse speed change ratio.

During the speed change operation, the reverse precess cam (R. P. C.) is turned in a manner to return servo piston 13 toward the neutral position, and when the actually made speed change ratio of transmission 100 becomes into coincidence with the instructed reverse speed change ratio, the reverse precess cam is turned to such a position as to place spool 38 to the original position to close both output circuits 44 and 45. With this, the reverse speed change ratio thus instructed is kept by transmission 100.

As is shown in the drawing (FIG. 4), normally, due to the biasing force of spring 33*b*, spool 33*a* of forward/reverse switching valve 33 is biased to take the forward position as shown where output circuits 42 and 43 are connected to output circuits 40 and 41 respectively. Thus, under this condition, the above-mentioned speed change control of forward speed control valve 37 is carried out.

In this forward position, the connection between ports 33*c* and 33*d* is blocked, and thus, line pressure "$P_L$" is not applied to reverse speed control valve 38 from sub-circuit 35, and thus, the above-mentioned speed change control by reverse speed control valve 38 is not carried out.

As has been mentioned in the description of FIGS. 2 and 3, during reverse movement of the vehicle, due to the pivot movement of pump housing 25 of extra oil pump 22 or the work of the reverse sensor by which spool 33*a* is pushed into the reverse position against spring 33*b*, forward/reverse switching valve 33 assumes a condition wherein output circuits 42 and 43 are communicated with output circuits 44 and 45 respectively.

In this reverse position, the connection between ports 33*c* and 33*d* is established, and thus, line pressure "$P_L$" is applied to reverse speed control valve 38 from sub-circuit 35 through sub-circuit 48. Accordingly, the above-mentioned speed change control by reverse speed control valve 38 is carried out.

In case of usage of the reverse sensor for shifting spool 33*a* to the reverse position, lubrication of the reverse sensor is necessary. This lubrication is achieved by oil that is fed from sub-circuit 48 through a check valve 49. In this case, the valve opening pressure of this check valve 49 is so set that line pressure "$P_L$" in sub-circuit 48 is not lowered to such a degree as to influence the speed change control by reverse speed control valve 38.

As is shown in FIG. 4, outlet pipe 32 from extra oil pump 22 is connected to sub-circuit 35.

This sub-circuit 35 corresponds to a so-called line pressure input circuit for reverse speed control valve 38 for forward/reverse switching valve 33 which permits oil feeding to reverse speed control valve 38 only under reverse movement of the vehicle. Extra oil pump 22 is equipped with a pressure relief valve 50 by which the internal pressure of outlet pipe 32 is kept below the valve opening pressure of this valve 50.

Outlet pipe or outlet circuit 32 has a check valve 51 installed therein for suppressing oil backflow toward extra oil pump 22. Sub-circuit 35 is connected to a downstream part of outlet circuit 32 through a check valve 52. Due to this check valve 52, oil backflow in sub-circuit 35 toward the engine driven oil pump 21 is suppressed.

From outlet circuit 32 upstream of check valve 51, there extends a power roller lubrication circuit 53 which is led to a lubrication portion of each power roller 8. This circuit 53 has a check valve 54 for suppressing oil backflow.

Check valves 51 and 52 are constructed to have a smaller valve opening pressure, while, check valve 54 has a valve opening pressure higher than that of check valves 51 and 52 but smaller than that of relief valve 50.

Within low side piston chamber 18L of servo piston body 18, there is installed a plate spring 55 for biasing servo piston 13 toward high side piston chamber 18H. Plate spring 55 is arranged to produce such a basing force as to move servo piston 13 to at least a neutral position.

As will be described hereinafter, this plate spring 55 functions to suppress undesired high speed change ratio starting of the vehicle which would occur when the vehicle has been hauled with its front face facing forward. That is, if plate spring 55 is not present, such hauling tends to induce that servo piston 13 is moved from high side piston chamber 18H toward low side piston chamber 18L bringing about up-shifting movement in transmission 100. However, due to provision of the plate spring 55, such undesired movement of servo piston 13 toward low side piston chamber 18L is suppressed and thus the high speed staring of the vehicle does not occur.

In the following, operation of transmission 100 for speed change will be described with the aid of the drawings.

Under cruising, that is, when the vehicle runs forward, countershaft 15 (see FIG. 3) turns eccentric cam 24 of extra oil pump 22 in the direction of the arrow "α" (or the reverse sensor senses the forward rotation of countershaft 15 in case of the modified extra oil pump 22' of FIG. 5). Thus, forward/reverse switching valve 33 takes the forward position as shown in FIG. 4, and thus, the above-mention forward speed change is carried out through forward speed control valve 37 using the line pressure "PL" from main circuit 34 as a base pressure.

While, under backward movement of the vehicle, countershaft 15 (see FIG. 3) turns eccentric cam 24 of extra oil pump 22 in the direction of the arrow "β" (or the reverse sensor senses the reverse rotation of countershaft 15 in case of the modified extra oil pump 22' of FIG. 5). Thus, forward/reverse switching valve 3 takes the reverse position (not shown), that is, the depressed position in FIG. 4, and thus, the above-mentioned reverse speed change is carried out through reverse speed control valve 38 using the line pressure "PL" from sub-circuit 35 as a base pressure.

During the reverse speed change, oil flow from sub-circuit 35 toward extra oil pump 22 (or 22') is suppressed by check valve 51. Thus, interference with speed change operation, which would occur when line pressure "PL" is leaked, is prevented.

When engine 1 is at a standstill, the main oil pump 21 is kept stopped and thus produces no oil pressure. Accordingly, the above-mentioned speed change operation is not carried out.

While, when, with engine 1 kept stopped, the driven road wheels are forced to rotate due to coasting or traction of the vehicle, countershaft 15 (see FIG. 3) is forced to turn eccentric cam 24 of extra oil pump 22 in the forward direction of the arrow "α" or in the reverse direction of the arrow "β".

As is described hereinabove, when eccentric cam 24 is turned, extra oil pump 22 (or 22') can produce oil pressure in accordance with turning speed of the cam 24 irrespective of the turning direction of the same.

More specifically, when, with engine 1 kept stopped, the driven road wheels are forced to rotate in a reversed direction due to traction of the vehicle with its front face facing backward, countershaft 11 rotates eccentric cam 24 in the direction of the arrow "β" of FIG. 3. Thus, because of drag function of cam 24 to pump housing 25, the latter is swung to the position "B" pushing or shifting spool 33a of forward/reverse switching valve 33 to the depressed position, viz., the reverse position.

With this, as has been mentioned hereinabove, ports 33c and 33d (see FIG. 4) become communicated, and thus, the oil pressure produced by extra oil pump 22 (or 22') is led to reverse speed control valve 38 through outlet circuit 32, check valve 51, ports 33c and 33d and sub-circuit 48. Thus, due to operation of reverse speed control valve 38, a fixed reverse speed change ratio is kept by transmission 100 using the oil pressure produced by extra oil pump 22 (or 22') as a base pressure.

If, due to a slower backward movement of the hauled vehicle, extra oil pump 22 (or 22') fails to produce a satisfied oil pressure for establishing the fixed reverse speed change ratio in transmission 100, the following operation takes place.

That is, under such condition, due to a driving force produced by such backward movement of the hauled vehicle, each trunnion 12 (see FIG. 4) is urged to get ready for movement in the direction of the arrow "ε" from its neutral position forcing transmission 100 to be ready for up-shifting. This urged movement of trunnion 12 induces a feed-back movement of spool 38a of reverse speed control valve 38 in the direction of the arrow "ρ" through the reverse precess cam (R.P.C.).

With such feed-back movement, reverse speed control valve 38 establishes the communication between output circuit 44 and a port 38b and the communication between sub-circuit 48 and output circuit 45 feeding oil pressure in sub-circuit 48 to output circuit 45. As a result, oil pressure in low side piston chamber 18L is reduced and at the same time oil pressure in high side piston chamber 18H is increased thereby avoiding the above-mentioned stroke of trunnion in the direction of the arrow "ε".

Due to pressure reduction in low side piston chamber 18L and pressure increase in high side piston chamber 18H, servo piston 13 is moved upward in FIG. 4 against the biasing force of plate spring 55, so that trunnion 12 is shifted in a corresponding direction inducing a down-shifting of transmission 100.

As has been described hereinabove, even when, with engine 1 kept stopped, the driven road wheels of the motor vehicle are rotated in a reverse direction due to traction of the vehicle with its front face facing backward, transmission 100 can keep the reserve speed change ratio at the predetermined lower ratio side. Thus, non-smoothed start movement of the vehicle (viz., high speed change ratio starting of the vehicle) at a subsequent starting of the same is prevented.

Due to provision of check valve 52, undesired escape of oil pressure from outlet circuit 32 toward sub-circuit 35 is suppressed, and thus, the undesired high speed change ratio starting of the vehicle is assuredly avoided.

While, when, with engine 1 kept stopped, the driven road wheels are forced to rotate in a forward direction due to coasting of the vehicle, or traction of the vehicle with its front face facing forward, forward/reverse switching valve 33 assumes the position as shown in FIG. 4 blocking the communication between ports 33c and 33d. Accordingly, the oil pressure in outlet circuit 32 is not led to reverse speed control valve 38. Forward speed control valve 37 is applied with no oil pressure. Thus, both the low and high side piston chambers 18L and 18H of servo piston 13 are not applied with oil pressure.

Accordingly, servo piston 13 is forced to take a position that is determined by a biasing force of plate spring 55. As is described hereinabove, plate spring 55 is so set as to bias servo piston 13 to move to the above-mentioned neutral position. Thus, due to the function of the plate spring 55, servo piston 13 is prevented from moving toward low side piston chamber 18L from high side piston chamber 18H beyond the neutral position. Accordingly, speed change shifting toward a higher speed change ratio side under coasting of the vehicle or traction of the vehicle with its front face facing forward is avoided, and thus, undesired high speed change ratio starting of the vehicle is suppressed.

As is described hereinabove, when, with engine 1 kept stopped, the driven road wheels are forced to rotate forward or rearward due to coasting or traction of the vehicle, transmission 100 is prevented from making up-shifting movement toward a higher speed change ratio side, and thus, undesired high speed change ratio starting of the vehicle is avoided.

In the first embodiment of the invention, oil pressure produced by extra oil pump 22 or 22' is applied to only reverse speed control valve 38. Thus, oil pressure escape at forward speed control valve 37 can be minimized and thus, extra oil pump 22 or 22' can be made compact in size.

Figure 6:
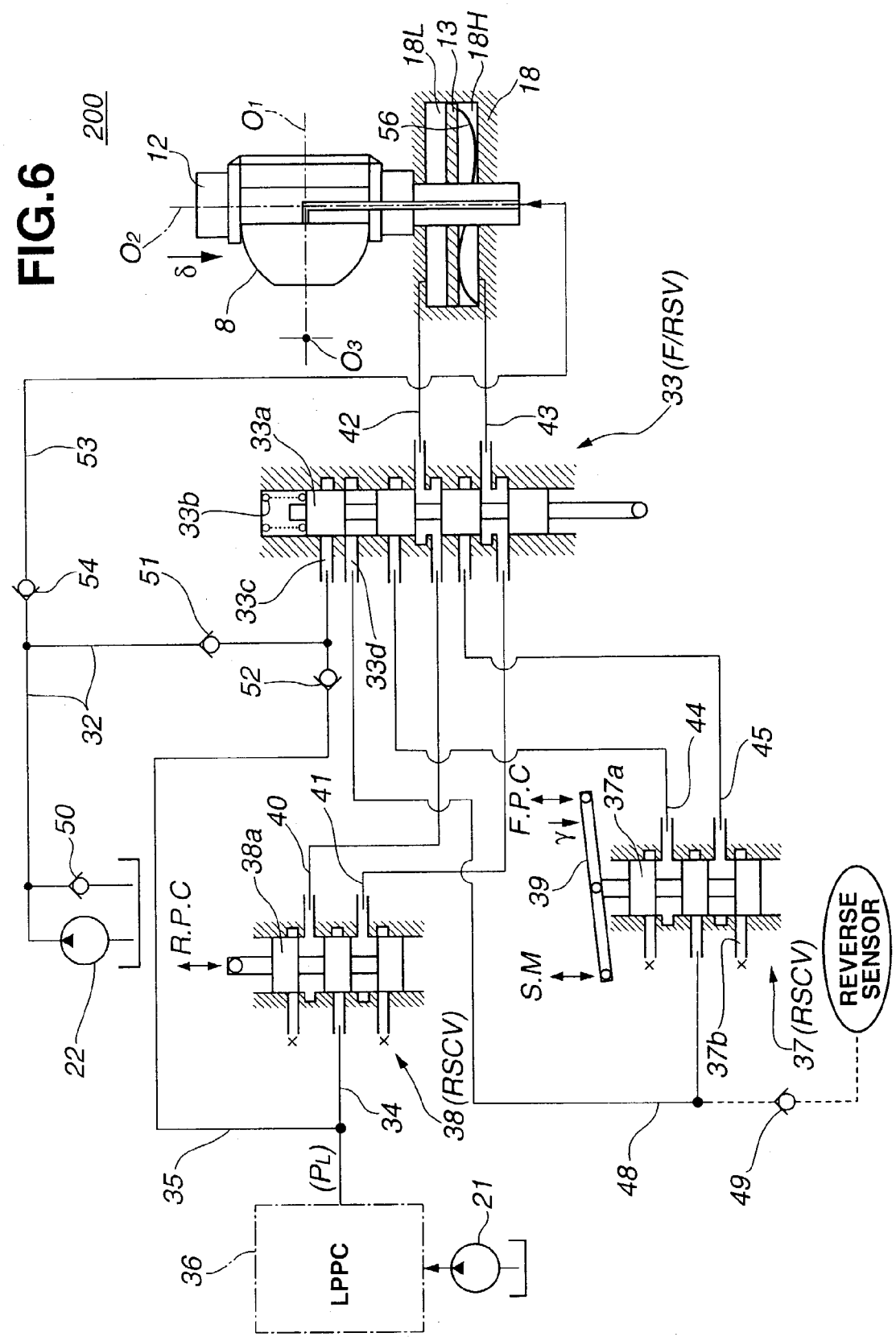
FIG. 6 is a view similar to FIG. 4, but showing a hydraulic circuit employed in a second embodiment of the present invention.

Referring to FIG. 6, there is shown a hydraulic circuit that is employed in a toroidal type continuously variable transmission 200 of the second embodiment of the present invention.

As shown, in this second embodiment, unlike the above-mentioned first embodiment, reverse speed control valve 38 is arranged in main circuit 34 and forward speed control valve 37 is arranged in sub-circuit 37.

Furthermore, forward/reverse switching valve 33 is arranged to take an opposite operation to the valve 33 employed in the first embodiment. That is, valve 33 shows the illustrated condition when the driven road wheels of the vehicle rotate in a reverse direction, and when the vehicle is under coasting, spool 33a of the valve 33 takes a depressed position (not shown) against the force of spring 33b, that is, the forward position. Accordingly, arrangement of forward and reverse speed control valves 37 and 38 relative to forward/reverse switching valve 33 is opposite to that in case of the above-mentioned first embodiment.

In case wherein the modified extra oil pump 22' shown in FIG. 5 is used, a mechanical forward sensor should be used for shifting spool 33a of forward/reverse switching valve 33. For lubricating the forward sensor, oil in circuit 48 is used.

Furthermore, in the second embodiment, a plate spring 56 is installed in the high side piston chamber 18H of servo piston 13 for biasing servo piston 13 toward low side piston chamber 18L. That is, for biasing servo piston 13 toward its neutral position, plate spring 56 is used.

For the reason which will be described in the following, plate spring 56 operates for preventing the high speed change ratio starting of the vehicle. That is, due to function of plate spring 56, undesired movement of servo piston 13 in the direction from low side piston chamber 18L toward high side piston chamber 18H, which would take place when the vehicle is being hauled with its front face facing backward, is prevented.

In the following, operation of transmission 200 for speed change will be described with the aid of the drawings.

Under backward movement of the vehicle, forward/reverse switching valve 33 the illustrated reverse position, and thus, the above-mentioned backward speed change operation is carried out through reverse speed control valve 38 using line pressure "P$_L$" from main circuit 34 as a base pressure.

While, under cruising, that is, when the vehicle runs forward, spool 33a of forward/reverse switching valve 33 is shifted to the depressed or forward position (not shown), so that the above-mentioned forward speed change control is carried out through forward speed control valve 37 using the line pressure "P$_L$" from sub-circuits 35 and 48 as a base pressure.

During the forward speed change, oil flow from sub-circuit 35 toward extra oil pump 22 (or 22') is suppressed by check valve 51. Thus, interference with speed change operation, which would occur when line pressure "P$_L$" is leaked, is suppressed.

When engine 1 is at a standstill, the main oil pump 21 is kept stopped and produces no oil pressure. Accordingly, the above-mentioned speed change operation is not carried out.

While, when, with engine 1 kept stopped, the driven road wheels are forced to rotate due to coasting or traction of the vehicle, extra oil pump 22 (or 22') is operated to produce oil pressure that is led to output circuit 32.

When, with engine 1 kept stopped, the driven road wheels are forced to rotate in a forward direction due to coasting of the vehicle, forward/reverse switching valve 33 takes the depressed or forward position (not shown) establishing the communication between ports 33c and 33d, and thus, the oil pressure produced by extra oil pump 22 (or 22') is led to forward speed control valve 37 through outlet circuit 32, check valve 51, ports 33c and 33d and sub-circuit 48. Thus, due to operation of forward speed control valve 37, a lowest speed change ratio is kept by transmission 200 using the oil pressure produced by extra oil pump 22 (or 22') as a base pressure.

If, due to a slower forward movement of the hauled vehicle, extra oil pump 22 (or 22') fails to produce a satisfied oil pressure for establishing the lowest speed change ratio in transmission 200, the following operation takes place.

That is, under such condition, due to a driving force produced by such forward movement of the hauled vehicle, trunnion 12 is urged to get ready for movement in the direction of the arrow "δ" from its neutral position forcing transmission 200 to be ready for up-shifting. This urged movement of trunnion 12 induces a feed-back movement of speed control lever 39 in the direction of the arrow "γ" through the forward precess cam (not shown).

With such feed-back movement, forward speed control valve 37 establishes the communication between output circuit 44 and sub-circuit 48 and the communication between output circuit 45 and a drain port 37b, so that the oil pressure in low side piston chamber 18L is increased and the oil pressure in high side piston chamber 18H is reduced. As a result, the above-mentioned stroke of trunnion 12 in the direction of the arrow "δ" does not take place.

Due to pressure increase in low side piston chamber 18L and pressure reduction in high side piston chamber 18H, servo piston 13 is moved is moved downward in FIG. 6 against the biasing force of plate spring 56, so that trunnion 12 is shifted in a corresponding direction inducing a down-shifting of transmission 200.

As has been described hereinabove, even when, with engine 1 kept stopped, the driven road wheels of the motor vehicle are rotated in a forward direction due to causing of the vehicle or traction of the vehicle with its front face facing forward, transmission 200 can keep the reverse speed change ratio at the lowest side. Thus, undesired high speed change ratio starting of the vehicle is suppressed at a subsequent starting of the same.

Due to provision of check valve 52, undesired escape of oil pressure from outlet circuit 32 toward sub-circuit 35 is suppressed, and thus, the undesired high speed change ratio starting of the vehicle is assuredly avoided.

While, when, with engine 1 kept stopped, the driven road wheels are forced to rotate in a reverse direction due to traction of the vehicle with its front face facing backward, forward/reverse switching valve 33 assumes the position as shown in FIG. 6 blocking the communication between ports 33c and 33d. Accordingly, the oil pressure in outlet circuit 32 is not led to forward speed control valve 37. Reverse speed control valve 38 is applied with no oil pressure. Thus, both the low and high side piston chambers 18L and 18H of servo piston 13 are not applied with oil pressure.

Accordingly, servo piston 13 is forced to take a certain position that is determined by a biasing force of plate spring 56. As is described hereinabove, plate spring 56 is so set as to bias servo piston 13 to move to the neutral position. Thus, due to the function of the plate spring 56, servo piston 13 is prevented from moving toward high side piston chamber 18H from low side piston chamber 18L beyond the neutral position. Accordingly, up-shifting toward a higher speed change ratio side under the traction of the vehicle is avoided and thus, undesired high speed change ratio starting of the vehicle is suppressed.

As is described hereinabove, when, with engine 1 kept stopped, the driven road wheels are forced to rotate forward or rearward due to coasting or traction of the vehicle, transmission 200 is prevented from making up-shifting movement toward a higher speed change ratio side, and thus, undesired high speed change ratio starting of the vehicle is avoided.

In the second embodiment of the invention, oil pressure produced by extra oil pump 22 or 22' is applied to only forward speed control valve 37. Thus, oil pressure escape at reverse speed control valve 38 can be minimized and thus, extra oil pump 22 or 22' can be made compact in size.

The entire contents of Japanese Patent Application 2002-209518 (filed Jul. 18, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A toroidal type continuously variable transmission comprising:
   an input disc adapted to be driven by prime mover of a motor vehicle;
   an output disc coaxially arranged with the input disc, the output disc being adapted to be constantly connected to road wheels of the vehicle;
   power rollers each being interposed between the input and output discs to transmit a torque from the input disc to the output disc through the power rollers;
   trunnions rotatably supporting the power rollers respectively;
   a main oil pump powered by the prime mover;
   a line pressure producing circuit which produces a line pressure by adjusting an oil pressure produced by the main oil pump;
   a hydraulic servo mechanism powered by the main oil pump, the hydraulic servo mechanism inducing a speed change between the input and output discs by actuating the trunnions in such a manner as to pivot a rotation axis of each power roller between a neutral position where the rotation axis intersects a common axis of the input and output discs at right angles and an offset position where the rotation axis is shifted toward a shaft axis of the trunnion while being offset relative to the common axis;
   a forward speed control valve through which the line pressure passes when the vehicle moves forward;
   a reverse speed control valve through which the line pressure passes when the vehicle moves backward;
   a feedback mechanism which feeds back a progress of the speed change to the hydraulic servo mechanism so that when a practical speed change ratio between the input and output discs becomes in coincidence with an instructed ratio, each power roller is returned to the neutral position;
   a forward/reverse switching valve which selectively feeds the line pressure to one of the forward and reverse speed control valves in accordance with a direction in which the vehicle moves, the forward/reverse switching valve having a line pressure inlet part to which the line pressure is applied;
   an extra oil pump powered by the road wheels; and
   an extra hydraulic circuit which feeds an oil pressure produced by the extra oil pump to the line pressure inlet part of the forward/reverse switching valve.

2. A toroidal type continuously variable transmission as claimed in claim 1, in which a sub-circuit extending between the line pressure producing circuit and the line pressure inlet part of the forward/reverse switching valve is equipped with a check valve for suppressing an oil flow in a direction from the forward/reverse switching valve toward the line pressure producing circuit.

3. A toroidal type continuously variable transmission as claimed in claim 1, in which the extra hydraulic circuit is equipped with a check valve for suppressing an oil flow in a direction from the forward/reverse switching valve toward the extra oil pump.

4. A toroidal type continuously variable transmission as claimed in claim 1, further comprising a biasing member which obstructs a movement of the trunnion that would be induced by one of the forward and reverse speed control valves for making up-shifting of the transmission when the other of the forward and reverse speed control valves is practically applied with the oil pressure from the extra oil pump.

5. A toroidal type continuously variable transmission as claimed in claim 1, in which the extra oil pump is installed in a body of a servo piston of the hydraulic servo mechanism using the servo piston body as a part thereof.

6. A toroidal type continuously variable transmission as claimed in claim 1, in which the extra oil pump is connected to a body of a servo piston of the hydraulic servo mechanism.

7. A toroidal type continuously variable transmission as claimed in claim 1, in which the extra oil pump is installed in a control valve body that has the forward and reverse speed control valves mounted therein.

8. A toroidal type continuously variable transmission as claimed in claim 1, in which the extra oil pump is connected to a control valve body that has the forward and reverse speed control valves mounted therein.

9. A toroidal type continuously variable transmission as claimed in claim 1, in which the output disc and the road wheels are constantly connected through a countershaft that extends in parallel with the common axis of the input and output discs, and in which the extra oil pump is directly powered by the countershaft.

10. A toroidal type continuously variable transmission as claimed in claim 1, in which the extra oil pump comprises:
   a cam driven by a countershaft through which the output disc is connected to the road wheels;
   a pump housing;
   a plunger slidably received in the pump housing to define therein a pump chamber, the plunger having one end contactable with the cam;
   a spring installed in the work chamber to bias the plunger toward the cam;
   inlet and outlet ports connected to the pump chamber respectively; and
   inlet and outlet valves installed in the inlet and outlet ports respectively.

11. A toroidal type continuously variable, transmission as claimed in claim 10, in which the pump housing is rotatably held by the countershaft, and in which the pump housing has a portion to which a spool of the forward/reverse switching valve is pivotally connected.

12. A toroidal type continuously variable transmission as claimed in claim 1, in which the forward/reverse switching valve feeds the line pressure to the reverse speed control valve only when the road wheels turn in a reversed direction, and in which the hydraulic servo mechanism comprises:
   a servo piston which actuates a corresponding one of the trunnions when moved;
   low and high side piston chambers for axially moving the servo piston when a difference in oil pressure is produced therebetween;
   a first hydraulic circuit which, when the road wheels turn in a forward direction, feeds one of the low and high side piston chambers with the line pressure from the line pressure producing circuit through the forward speed control valve thereby to incline the power roller through the trunnion in a direction of one of down-shifting and up-shifting;
   a second hydraulic circuit which, when the road wheels turn in a backward direction, feeds one of the low and high side piston chambers with the line pressure from the line pressure producing circuit through the reverse speed control valve thereby to incline the power roller through the trunnion in a direction of one of up-shifting and down-shifting; and
   a biasing member which biases the servo piston in a direction from the low side piston chamber to the high side piston chamber toward a position corresponding to the neutral position of the rotation axis of the power roller.

13. A toroidal type continuously variable transmission as claimed in claim 1, in which the forward/reverse switching valve feed the line pressure to the forward speed control valve only when the road wheels turn in a forward direction, and in which the hydraulic servo mechanism comprises:
   a servo piston which actuates a corresponding one of the trunnions when moved;
   low and high side piston chambers for axially moving the servo piston when a difference in oil pressure is produced therebetween;
   a first hydraulic circuit which, when the road wheels turn in a forward direction, feeds one of the low and high side piston chambers with the line pressure from the line pressure producing circuit through the forward speed control valve thereby to incline the power roller through the trunnion in a direction of one of down-shifting and up-shifting;
   a second hydraulic circuit which, when the road wheels turn in a backward direction, feeds one of the low and high side piston chambers with the line pressure from the line pressure producing circuit through the reverse speed control valve thereby to incline the power roller through the trunnion in a direction of one of up-shifting and down-shifting; and
   a biasing member which biases the servo piston in a direction from the high side piston chamber to the low side piston chamber toward a position corresponding to the neutral position of the rotation axis of the power roller.

* * * * *